(12) United States Patent
Huang et al.

(10) Patent No.: US 10,120,546 B2
(45) Date of Patent: Nov. 6, 2018

(54) INTERACTIVE ACTIVITY GENERATING METHOD AND APPARATUS AND COMPUTER STORAGE MEDIUM

(71) Applicant: TENCENT TECHNOLOGY (SHENZHEN) COMPANY LIMITED, Shenzhen (CN)

(72) Inventors: Jihua Huang, Shenzhen (CN); Hongbang Li, Shenzhen (CN); Yuezi Xu, Shenzhen (CN); Yu Ma, Shenzhen (CN); Xianpan Tian, Shenzhen (CN); Zhenzhen Yu, Shenzhen (CN); Guodong Zhang, Shenzhen (CN); Jing Xu, Shenzhen (CN); Tiajun Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 555 days.

(21) Appl. No.: 14/710,157

(22) Filed: May 12, 2015

(65) Prior Publication Data
US 2015/0242098 A1    Aug. 27, 2015

Related U.S. Application Data

(63) Continuation of application No. PCT/CN2013/084544, filed on Sep. 27, 2013.

(30) Foreign Application Priority Data

Nov. 21, 2012   (CN) .......................... 2012 1 0475966

(51) Int. Cl.
   *G06F 3/048*    (2013.01)
   *G06F 3/0484*   (2013.01)
   (Continued)

(52) U.S. Cl.
   CPC ........ *G06F 3/04842* (2013.01); *G06F 3/0482* (2013.01); *G06F 17/243* (2013.01);
   (Continued)

(58) Field of Classification Search
   CPC ...................................................... G06F 3/0481
   See application file for complete search history.

(56) References Cited

U.S. PATENT DOCUMENTS 6,304,886 B1 * 10/2001 Bernardo .............. G06F 17/211
                                                 707/E17.112
6,934,696 B1    8/2005 Williams et al.
(Continued)

FOREIGN PATENT DOCUMENTS

CN          1967588 A      5/2007
CN        101706821 A      5/2010
(Continued)

OTHER PUBLICATIONS

International Search Report for International Application No. PCT/CN2013/084544 dated Jan. 2, 2014, and its English translation thereof.
International Preliminary Report for App. No. PCT/CN2013/084544, dated May 26, 2015.
(Continued)

*Primary Examiner* — Matthew Ell
(74) *Attorney, Agent, or Firm* — Sughrue Mion, PLLC

(57) ABSTRACT

An interactive activity generating method, which includes setting a database for storing addresses of interactive activity platforms, providing creating options of interactive activities in an activity creating interface. The method includes setting an information configuration interface corresponding to a creating option of each interactive activity for filling in interactive activity information. The method includes detecting a selected creating option in the activity creating interface when an interactive activity is created, and finding an address of a corresponding interactive activity platform in
(Continued)

the database. The method includes sending interactive activity information filled in an information configuration interface corresponding to the selected creating option to the interactive activity platform. The method includes generating an interactive activity interface after compiling by the interactive activity platform.

9 Claims, 1 Drawing Sheet

(51) Int. Cl.
*G06F 17/30* (2006.01)
*G06F 17/24* (2006.01)
*G06F 3/0482* (2013.01)

(52) U.S. Cl.
CPC .. *G06F 17/30126* (2013.01); *G06F 17/30876* (2013.01); *Y02D 10/45* (2018.01)

(56) References Cited

U.S. PATENT DOCUMENTS

| | | |
|---|---|---|
| 2002/0046245 A1 | 4/2002 | Hillar et al. |
| 2010/0299586 A1 | 11/2010 | Yoo et al. |

FOREIGN PATENT DOCUMENTS

| | | |
|---|---|---|
| CN | 101986293 A | 3/2011 |
| CN | 102314430 A | 1/2012 |
| CN | 102314431 A | 1/2012 |
| CN | 102314432 A | 1/2012 |
| CN | 102349089 A | 2/2012 |
| CN | 102385580 A | 3/2012 |

OTHER PUBLICATIONS

Chinese Office Action for App. No. 2012104759661 dated Mar. 20, 2017, and an English concise explanation of relevance thereof.

* cited by examiner

INTERACTIVE ACTIVITY GENERATING METHOD AND APPARATUS AND COMPUTER STORAGE MEDIUM

CROSS-REFERENCE TO RELATED APPLICATIONS

This application is a continuation of International Application No. PCT/CN2013/084544, filed Sep. 27, 2013. This application claims the benefit and priority of Chinese Application No. 201210475966.1, filed Nov. 21, 2012. The entire disclosures of each of the above applications are incorporated herein by reference.

FIELD

The present disclosure relates to an interactive activity generating method and apparatus and a computer storage medium.

BACKGROUND

This section provides background information related to the present disclosure which is not necessarily prior art.

Currently, a page interactive activity on the Internet is completed in a customized development manner according to individual demand of a website owner and online interactive activities are also carried out when many products are promoted on the Internet where customized development is needed for each of the interactive activities. However, many interactive activities share common features, for example, a lucky draw activity usually falls into three categories of lucky wheel, golden egg, and slot machine. Currently, customized development for each activity wastes labor and the quality of the interactive activities is unstable.

SUMMARY

This section provides a general summary of the disclosure, and is not a comprehensive disclosure of its full scope or all of its features.

Various embodiments of the present disclosure mainly provide an interactive activity generating method and apparatus and a computer storage medium, so as to implement fast development of an interactive activity.

The technical solutions of the various embodiments are implemented as follows.

Various embodiments provide an interactive activity generating method, including:

setting a database for storing addresses of interactive activity platforms, providing creating options of interactive activities in an activity creating interface, and setting an information configuration interface corresponding to a creating option of each interactive activity for filling in interactive activity information; and detecting a selected creating option in the activity creating interface when an interactive activity is created, finding an address of a corresponding interactive activity platform in the database according to the selected creating option, sending interactive activity information filled in an information configuration interface corresponding to the selected creating option to the interactive activity platform according to the address of the interactive activity platform, and generating an interactive activity interface after compiling by the interactive activity platform.

Various embodiments provide an interactive activity generating apparatus, including a database, an interface creating module, an activity creating module, and an interactive activity platform;

the database configured to store addresses of interactive activity platforms;

the interface creating module configured to provide creating options of interactive activities in an activity creating interface, and set an information configuration interface corresponding to a creating option of each interactive activity for filling in interactive activity information;

the activity creating module configured to detect a selected creating option in the activity creating interface when an interactive activity is created, find an address of a corresponding interactive activity platform in the database according to the selected creating option, and send interactive activity information filled in an information configuration interface corresponding to the selected creating option to the interactive activity platform according to the address of the interactive activity platform; and the interactive activity platform configured to generate an interactive activity interface after compiling the interactive activity information.

Various embodiments further provide a computer storage medium, a computer program stored in the computer storage medium, and the computer program used for executing the interactive activity generating method.

Various embodiments provide an interactive activity generating method and apparatus and a computer storage medium, where the method includes setting a database for storing addresses of interactive activity platforms, providing creating options of interactive activities in an activity creating interface, and setting an information configuration interface corresponding to a creating option of each interactive activity for filling in interactive activity information; detecting a selected creating option in the activity creating interface when an interactive activity is created, finding an address of a corresponding interactive activity platform in the database according to the selected creating option, sending interactive activity information filled in an information configuration interface corresponding to the selected creating option to the interactive activity platform according to the address of the interactive activity platform, and generating an interactive activity interface after compiling by the interactive activity platform.

The interactive activity developer can set personalized interactive activity information by using the activity creating interface and create a desired interactive activity quickly, which saves a significant amount of development labor and cost, and basically implements zero development.

Further areas of applicability will become apparent from the description provided herein. The description and specific examples in this summary are intended for purposes of illustration and are not intended to limit the scope of the present disclosure.

DRAWINGS

The drawings described herein are for illustrative purposes of selected embodiments and not all possible implementations and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

According to various embodiments, an interactive activity generating method includes setting a database for storing addresses of interactive activity platforms, providing creating options of interactive activities in an activity creating interface, and setting an information configuration interface corresponding to a creating option of each interactive activity for filling in interactive activity information; and detecting a selected creating option in the activity creating interface when an interactive activity is created, finding an address of a corresponding interactive activity platform in the database according to the selected creating option, sending interactive activity information filled in an information configuration interface corresponding to the selected creating option to the interactive activity platform according to the address of the interactive activity platform, and generating an interactive activity interface after compiling by the interactive activity platform.

The following describes the present disclosure in further detail with reference to the accompanying drawings and the specific embodiments.

Figure 1:
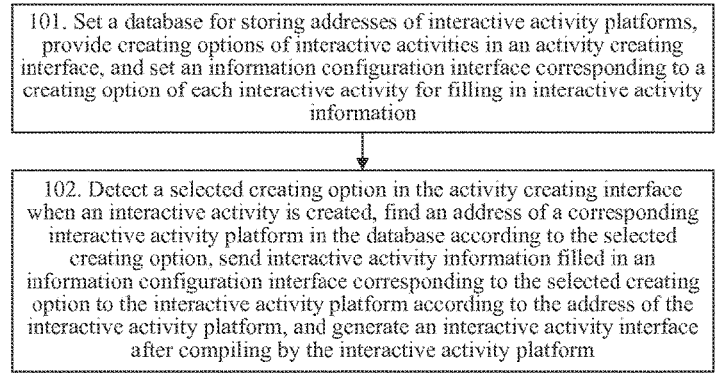
FIG. 1 is a flowchart of an interactive activity generating method according to various embodiments.
Figure 3:
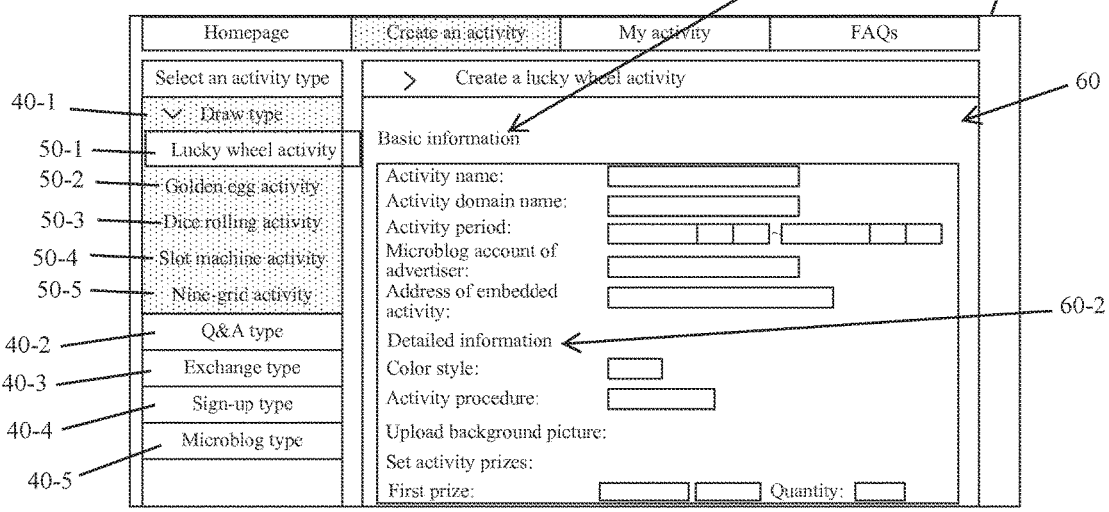
FIG. 3 is a diagram of an activity creating interface according to various embodiments.

As shown in FIGS. 1 and 3, various embodiments provide an interactive activity generating method, where the method includes the following:

Block 101: Set a database for keeping addresses of interactive activity platforms, provide creating options of interactive activities in an activity creating interface, and set an information configuration interface corresponding to a creating option of each interactive activity for filling in interactive activity information.

Providing creating options of interactive activities in an activity creating interface 30 includes setting an interactive activity type option according to an interactive activity type 40 in the activity creating interface 30 and setting a creating option 50 of each interactive activity belonging to the interactive activity type 40 under each interactive activity type option. The interactive activity type includes a draw type 40-1, and/or a Q&A type 40-2, and/or an exchange type 40-3, and/or a sign-up type 40-4, and/or a microblog type 40-5. Taking the draw type as an example, the draw type includes a creating option 50-1 of a lucky wheel activity, and/or a creating option 50-2 of a golden egg activity, and/or a creating option 50-3 of a dice rolling activity, and/or a creating option 50-4 of a slot machine activity, and/or a creating option 50-5 of a nine-grid activity, and the like.

The information configuration interface 60 includes a basic information interface 60-1 and a detailed information interface 60-2, where the basic information interface includes an input box for filling in an activity name, an input box for filling in an activity domain name, an input box for filling in an activity period, an input box for filling in user account information, an input box for filling in an address of an embedded activity, and the like; and the detailed information interface includes an input box for selecting a color style, an input box for selecting an activity procedure, an input box for selecting a background picture, an input box for selecting activity prize information, and the like.

Block 102: Detect a selected creating option in the activity creating interface when an interactive activity is created, find an address of a corresponding interactive activity platform in the database according to the selected creating option, send interactive activity information filled in an information configuration interface corresponding to the selected creating option to the interactive activity platform according to the address of the interactive activity platform, and generate an interactive activity interface after compiling by the interactive activity platform.

Detecting a selected creating option in the activity creating interface includes determining the selected creating option in the activity creating interface by using a mouse focusing function.

Finding an address of a corresponding interactive activity platform in the database according to the selected creating option includes finding the address of the corresponding interactive activity platform in the database according to a name or an identifier of an interactive activity corresponding to the selected creating option.

Figure 2:
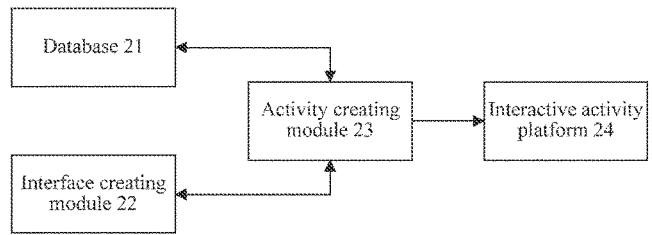
FIG. 2 is a structural diagram of an interactive activity generating apparatus according to various embodiments.

To implement the foregoing method, as shown in FIG. 2, various embodiments further provide an interactive activity generating apparatus, where the apparatus includes a database 21, an interface creating module 22, an activity creating module 23, and an interactive activity platform 24. Where the database 21 is configured to store addresses of interactive activity platforms 24. The interface creating module 22 is configured to provide creating options of interactive activities in an activity creating interface and set an information configuration interface corresponding to a creating option of each interactive activity for filling in interactive activity information. The activity creating module 23 is configured to detect a selected creating option in the activity creating interface when an interactive activity is created, find an address of a corresponding interactive activity platform 24 in the database 21 according to the selected creating option, and send interactive activity information filled in an information configuration interface corresponding to the selected creating option to the interactive activity platform 24 according to the address of the interactive activity platform 24. The interactive activity platform 24 is configured to generate an interactive activity interface after compiling the interactive activity information.

The interface creating module 22 is configured to set an interactive activity type option according to an interactive activity type in the activity creating interface and set a creating option of each interactive activity belonging to the interactive activity type under each interactive activity type option. The interactive activity type includes a draw type, and/or a Q&A type, and/or an exchange type, and/or a sign-up type, and/or a micro-blog type. Taking the draw type as an example, the draw type includes a creating option of a lucky wheel activity, and/or a creating option of a golden egg activity, and/or a creating option of a dice rolling activity, and/or a creating option of a slot machine activity, and/or a creating option of a nine-grid activity, and the like.

The information configuration interface includes a basic information interface and a detailed information interface, where the basic information interface includes an input box for filling in an activity name, an input box for filling in an activity domain name, an input box for filling in an activity period, an input box for filling in user account information, an input box for filling in an address of an embedded activity, and the like. The detailed information interface includes an input box for selecting a color style, an input box for selecting an activity procedure, an input box for selecting a background picture, an input box for selecting activity prize information, and the like.

The activity creating module 23 is configured to determine the selected creating option in the activity creating interface by using a mouse focusing function. The activity creating module 23 is further configured to find the address of the corresponding interactive activity platform 24 in the database according to a name or an identifier of an interactive activity corresponding to the selected creating option.

FIG. 3 is a diagram of the foregoing activity creating interface. When a creating option of a lucky wheel activity is selected, a corresponding information configuration interface is displayed, and a developer can set interactive activity information in the information configuration interface.

If the interactive activity generating method described by the various embodiments is implemented in a form of a software functional module and sold or used as an independent product, the method can also be stored in a computer readable storage medium. Essentially, based on the foregoing, contribution of the technical methods of the various embodiments to the existing technology can be shown in a form of a software product, where the software product is stored in a storage medium including several instructions that enable a computer device (which may be a personal computer, a server, a network device, and the like) to execute all or some of the methods described by the various embodiments. The foregoing storage medium includes media that can store program codes, such as a USB flash drive, a removable hard disk, a read-only memory (ROM), a random access memory (RAM), a magnetic disk, an optical disc and the like. Through this method, the various embodiments are not limited to combinations of any specific hardware and software.

Accordingly, various embodiments further provide a computer storage medium, a computer program stored in the computer storage medium, and the computer program is used for executing the interactive activity generating method of the various embodiments.

In conclusion, an interactive activity developer can set personalized interactive activity information by using the activity creating interface and create a desired interactive activity quickly, which saves a significant amount of development labor and cost, and basically implements zero development.

The foregoing descriptions are merely preferred embodiments of the present disclosure, but are not intended to limit the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

What is claimed is:

1. An interactive activity generating method, comprising:
setting a database for storing addresses of interactive activity platforms, providing creating options of interactive activities in an activity creating interface, and setting an information configuration interface corresponding to a creating option of each interactive activity for filling in interactive activity information; and
detecting a selected creating option in the activity creating interface when an interactive activity is created, finding an address of a corresponding interactive activity platform in the database according to the selected creating option, sending interactive activity information filled in an information configuration interface corresponding to the selected creating option to the interactive activity platform according to the address of the interactive activity platform, and automatically generating a webpage including an interactive activity interface after compiling by the interactive activity platform;
wherein the information configuration interface comprises a basic information interface and a detailed information interface; the basic information interface comprises: an input box for filling in an activity name, an input box for filling in an activity domain name, an input box for filling in an activity period, an input box for filling in user account information, and an input box for filling in an address of an embedded activity; and
the detailed information interface comprises: an input box for selecting a color style, an input box for selecting an activity procedure, an input box for selecting a background picture and an input box for selecting activity prize information.

2. The generating method according to claim 1, wherein the providing creating options of interactive activities in an activity creating interface is that: setting an interactive activity type option according to an interactive activity type in the activity creating interface, and setting a creating option of each interactive activity belonging to the interactive activity type under each interactive activity type option.

3. The generating method according to claim 1, wherein the detecting a selected creating option in the activity creating interface is that: determining the selected creating option in the activity creating interface by using a mouse focusing function.

4. The generating method according to claim 1, wherein the finding an address of a corresponding interactive activity platform in the database according to the selected creating option is that: finding the address of the corresponding interactive activity platform in the database according to a name or an identifier of an interactive activity corresponding to the selected creating option.

5. An interactive activity generating apparatus, comprising a database, configured to store addresses of interactive activity platforms;
a processor;
a memory, storing instructions that, when executed by the processor, cause the processor to:
provide creating options of interactive activities in an activity creating interface, and set an information configuration interface corresponding to a creating option of each interactive activity for filling in interactive activity information;
detect a selected creating option in the activity creating interface when an interactive activity is created, find an address of a corresponding interactive activity platform in the database according to the selected creating option, and send interactive activity information filled in an information configuration interface corresponding to the selected creating option to the interactive activity platform according to the address of the interactive activity platform; and automatically generate a webpage including an interactive activity interface after compiling the interactive activity information;

wherein the information configuration interface comprises a basic information interface and a detailed information interface; the basic information interface comprises: an input box for filling in an activity name, an input box for filling in an activity domain name, an input box for filling in an activity period, an input box for filling in user account information, and an input box for filling in an address of an embedded activity; and the detailed information interface comprises: an input box for selecting a color style, an input box for selecting an activity procedure, an input box for selecting a background picture and an input box for selecting activity prize information.

6. The generating apparatus according to claim 5, wherein the instructions further cause the processor to set an interactive activity type option according to an interactive activity type in the activity creating interface, and set a creating option of each interactive activity belonging to the interactive activity type under each interactive activity type option.

7. The generating apparatus according to claim 5, wherein the instructions further cause the processor to determine the selected creating option in the activity creating interface by using a mouse focusing function.

8. The generating apparatus according to claim 5, wherein the instructions further cause the processor to find the address of the corresponding interactive activity platform in the database according to a name or an identifier of an interactive activity corresponding to the selected creating option.

9. A non-transitory computer storage medium, a computer program stored in the computer storage medium, and the computer program used for executing the generating method according to claim 1.

* * * * *